2,996,503
DERIVATIVES OF HETEROCYCLIC COMPOUNDS

James M. Sprague and Edward L. Engelhardt, Gwynedd Valley, and Marcia E. Christy, Cloverdale Park, Colmar, Pa., assignors to Merck & Co., Inc., Rahway, N.J., a corporation of New Jersey
No Drawing. Filed Sept. 23, 1955, Ser. No. 536,274
1 Claim. (Cl. 260—247.1)

This invention relates to new chemical compounds and to a novel method for preparing them. In particular the invention relates to new thiaxanthene derivatives having the following general formula

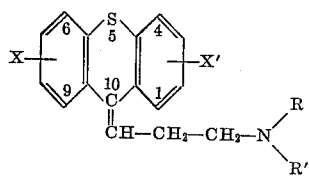

and non-toxic acid addition salts thereof, wherein X and X' respectively represents hydrogen, halogen particularly chlorine or bromine, a lower alkyl radical for example a straight or branched chain alkyl radical having from 1 to about 4 carbon atoms, and a lower alkoxy radical preferably having a straight or branched alkyl chain with from 1 to about 4 carbon atoms; and

is a tertiary amino group and particularly a tertiary amino group selected from the di-lower-alkylamino, 1-piperidyl, 1-pyrrolidyl or 4-morpholinyl groups. One or more of the hydrogens attached to the propylidene side chain can be substituted by a lower alkyl group provided the total number of carbons in all substituent alkyl groups does not exceed four. When one or more of the propylidene hydrogens is substituted by an alkyl group, one of the alkyl substituents can be linked with R' to form a heterocyclic ring with the nitrogen atom.

The compounds of this invention have been found to be valuable therapeutic agents particularly because of their anti-emetic properties. For physiological purposes, these substances are conveniently administered as salts, the identity of the acid being of little importance provided it is non-toxic. The salts are therefore considered to be equivalent to the bases.

The novel process which has been developed to make the compounds of this invention constitutes another feature of this invention. According to this process the Grignard reagent is prepared from the appropriate 3-tertiaryaminopropyl halide in tetrahydrofuran. The desired thiaxanthone derivative then is added to the reaction mixture. After hydrolysis of the Grignard adduct, the 10-(3-tertiaryaminopropyl)-10-hydroxythiaxanthene is isolated and dehydrated to the desired 10-(3-tertiaryaminopropylidene)-thiaxanthene that can be isolated as an acid addition salt.

Previous workers have employed ether and mixtures of ether and benzene as solvents in the preparation of basically substituted Grignard reagents. In the case of 3-dimethylaminopropyl chloride the Grignard reagent is insoluble in ether and the separation of the solid stops the reaction. While it has been discovered that the desired end product can be obtained by carefully controlled portionwise addition of the ketone, it is much more convenient and considerably less time consuming to carry out the process by operating in tetrahydrofuran which permits the formation of the organomagnesium compound to go to completion prior to the addition of the ketone.

The new compounds which are unsymmetrically substituted in the thiaxanthene nucleus may be obtained as a mixture of geometric isomers. When more than one isomer are isolated from a reaction mixture, they are designated in this application as the alpha and beta isomer in the order of isolation. While the mixture exhibits anti-emetic properties, in some instances the activity may be greater in one pure isomer than the other.

This reaction can be schematically illustrated as follows:

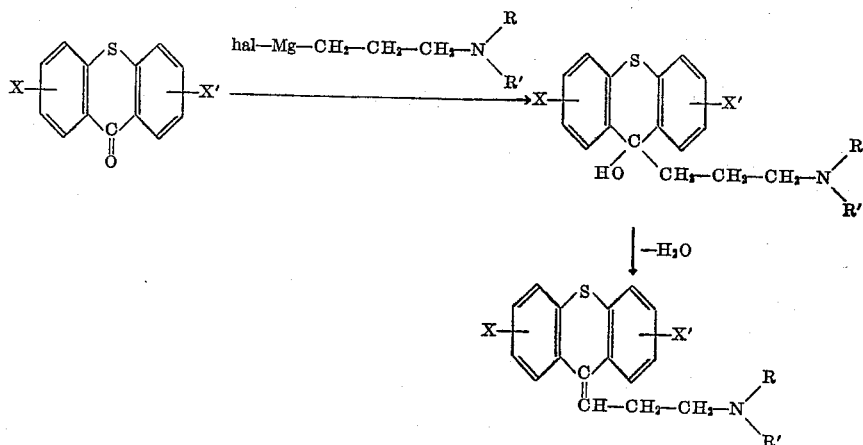

The dehydration can be effected by known procedures employing known dehydrating agents. Dehydrating agents which have been found especially useful are acetyl chloride, thionyl chloride and acetic anhydride. Other dehydrating agents as potassium bisulfate, concentrated hydrochloric acid and the like, can also be used. Solvents which are well adapted to the requirements of this step when acetyl chloride or a similar dehydrating agent is employed are chloroform and methylene chloride.

The new compounds and the improved process for making them will be described in more detail in the following illustrative examples. Methods, other than the improved process which constitutes a feature of this invention, that can be employed in making the novel compounds will also be described in the examples.

EXAMPLE 1

*10-(3-dimethylaminopropylidene)-thiaxanthene hydrogen oxalate*

Magnesium turnings, 2.8 g. (0.115 g. atom), was placed in a flask fitted with a mercury sealed stirrer, reflux condenser and a dropping funnel. The apparatus was flushed with dry nitrogen and protected from atmospheric moisture by means of a drying tube. Anhydrous ether (dried over calcium hydride), 50 ml., was added followed by half of 1.25 g. (0.0115 mole) of ethyl bromide. The remainder of the ethyl bromide was added to a solution of 14.0 g. (0.115 mole) of 3-dimethylaminopropyl chloride in 15 ml. of ether and 35 ml. of benzene. This solution was added to the stirred magnesium-ether mixture in portions over a period of 1 hour. The mixture then was stirred at reflux for 1½ hours. The reaction mixture, containing an insoluble colorless solid and unreacted magnesium, was cooled to room temperature. Thiaxanthone, 21.2 g. (0.1 mole) was pulverized and added to the stirred reaction mixture in portions over a period of 15 minutes. The heat liberated was sufficient to induce refluxing, the solid disappeared and a colorless solid began to separate. The solid became yellow and the reaction mixture became more difficult to stir. Benzene, 100 ml. was added as the addition of the ketone was completed. The reaction mixture was then refluxed and stirred for 2 hours, then cooled in ice and treated with 50 ml. of water. After warming till the solvent was at reflux, the mixture was filtered, and the filter cake washed with hot benzene. The organic layer was separated and extracted with 3 N hydrochloric acid until the aqueous layer was no longer colored (red). The acid extract was made basic and the yellow oil that separated extracted into ether. The ether extract was washed with water, dried over sodium sulfate and the ether evaporated. The residue, a viscous yellow oil, weighed 12.5 g., and was 10-(3-dimethylaminopropylidene)-thiaxanthene.

A portion of the base was converted to the hydrogen oxalate that melted at 155–157° C. after three recrystallizations from absolute alcohol.

*Analysis:*—Calculated for $C_{18}H_{19}NS \cdot C_2H_2O_4$: C, 64.67; H, 5.70; N, 3.77. Found: C, 65.10; H, 5.90; N, 3.82.

EXAMPLE 2

*2-chloro-10-(3-dimethylaminoproylidene)-thiaxanthene hydrochloride*

*Step A.*—Magnesium turnings, 4.86 g. (0.2 g. atom), were placed in a 500 ml. reaction flask fitted as described in Example 1. Tetra hydrofuran, 50 ml., and calcium hydride, 500 mg., were added. Ethyl bromide, 2.18 g., and a crystal of iodine then were added. A vigorous reaction set in that evolved sufficient heat to induce refluxing. After 5 minutes, a solution of 3-dimethylaminopropyl chloride (dried over calcium hydride) in 50 ml. of tetrahydrofuran was added to the refluxing solution at such a rate that gentle refluxing was maintained. The addition required 25 minutes. The reaction mixture was stirred at reflux for an additional 30 minutes when nearly all of the magnesium had dissolved and determination of magnesium in an aliquot of the solution showed that an 82% yield of Grignard reagent had been obtained. The reaction mixture was cooled in an ice bath and stirred while 24.67 g. (0.1 mole) of 2-chlorothiaxanthone was added over a period of 10 minutes. The reaction was stirred at room temperature for 30 minutes then allowed to stand over night in the refrigerator. The tetrahydrofuran was evaporated at 50° C. under reduced pressure. Benzene, 150 ml., was added to the residue. The mixture was hydrolysed in the cold by the dropwise addition of 50 ml. of water. The benzene layer was separated by decantation and the gelatinous precipitate washed with two 100 ml. portions of benzene. The precipitate then was mixed with diatomaceous earth, collected on a filter and washed with water and extracted with two 100 ml. portions of boiling benzene. The aqueous filtrate was extracted with 50 ml. of benzene, the combined benzene extracts washed with water and evaporated to dryness under reduced pressure. The crystalline residue, M.P. 140–147° C., weighed 30.8 g. Recrystallization from a mixture of benzene and hexane gave 27.6 g. (83%) of 2-chloro-10-(3-dimethylaminopropyl)-10-hydroxythiaxanthene, M.P. 152–154° C. Analytically pure material from another experiment melted at 153–154° C.

*Analysis:*—Calculated for $C_{18}H_{20}ONClS$: C, 64.75; H, 6.04; N, 4.20. Found: C, 64.80; H, 5.95; N, 4.20.

*Step B.*—3.34 g. (0.01 mole) of the thus obtained 2-chloro-10-(3-dimethylaminopropyl)-10-hydroxythiaxanthene was dissolved in 15 ml. of dry, alcohol-free chloroform. Acetyl chloride, 2.36 g. (0.03 mole), was added and the clear yellow solution was refluxed for one hour in a system protected by a drying tube. The solvent then was evaporated on the steam-bath under reduced pressure and the residue dissolved in absolute alcohol. The hydrochloride of 2-chloro-10-(3-dimethylaminopropylidene)-thiaxanthene was precipitated by the cautious addition of absolute ether. After drying at 70° C. the yield of white crystalline 2-chloro-10-(3-dimethylaminopropylidene)-thiaxanthene hydrochloride, M.P. 189–190° C. (to a cloudy melt), was 3.20 g. (90%). This material is a mixture of geometric isomers.

*Analysis:*—Calculated for $C_{18}H_{18}NClS \cdot HCl$: C, 61.36; H, 5.43; N, 3.97. Found: C, 61.51; H, 5.58; N, 3.89.

EXAMPLE 3

*α-Isomer of 2-chloro-10-(3dimethylaminopropylidene)-thiaxanthene hydrochloride*

The hydrochloride, obtained as described in Example 2 (step B), 35.23 g. (0.1 mole), was dissolved in 200 ml. of water. The solution was made basic with 50 ml. of 10 N sodium hydroxide and the mixture extracted with three 100 ml. portions of benzene. The combined benzene extracts were washed with 50 ml. of water in two portions and the solvent evaporated on the steam-bath under reduced pressure. The viscous yellow oily base weighed 31.14 g. (99%). The base was stored in the dark at room temperature for 11 days. During this time the α-isomer separated in the form of pale yellow crystals. The semisolid mixture was triturated with 50 ml. of petroleum ether (30–60° C.) and the insoluble solid collected and recrystallized repeatedly from hexane-petroleum ether mixtures and alcohol-water mixtures until a constant M.P. of 98–99° C. was attained. The α-isomer of 2-chloro-10-(3-dimethylaminopropylidene)-thiaxanthene then was converted to the hydrochloride that melted at 211.5–212.5° C. (dec.).

*Analysis:*—Calculated for $C_{18}H_{18}NClS \cdot HCl$: N, 3.97. Found: N, 3.99.

EXAMPLE 4

*β-Isomer of 2-chloro-10-(3-dimethylaminopropylidene)-thiaxanthene hydrochloride*

The petroleum ether filtrate obtained in Example 3 was cooled to −15° C. and the oily crystals that separated removed. Evaporation of the solvent from the filtrate left 14.96 g. of a deep yellow oily residue. This base, 2-chloro-10-(3-dimethylaminopropylidene)-thiaxanthene, was converted to the hydrogen oxalate that melted at 188.5–189.5° C. after repeated recrystallization from alcohol-water mixtures. The base then was liberated from the oxalate and converted to the hydrochloride that melted at 205.5–206.5° C. after crystallization from a mixture of absolute alcohol and absolute ether.

*Analysis:*—Calculated for $C_{18}H_{18}NClS \cdot HCl$: N, 3.97. Found: N, 3.97.

EXAMPLE 5

2-bromo-10-(3-dimethylaminopropylidene)-thiaxanthene hydrochloride

By replacing the 2-chlorothiaxanthone used in Example 2 by an equimolecular quantity of 2-bromothiaxanthone, and following substantially the same procedures described in steps A and B thereof, there was obtained 2-bromo-10-(3 - dimethylaminopropylidene) - thiaxanthene hydrochloride.

EXAMPLE 6

2-methoxy-7-chloro-10-[3-(4-morpholinyl)-propylidene]-thiaxanthene hydrochloride By replacing the 3-dimethylaminopropyl chloride and the 2-chlorothiaxanthone used in Example 2 by an equimolecular quantity of 3-(4-morpholinyl)-propyl chloride and 2-methoxy-7-chlorothiaxanthone respectively, and following substantially the same procedures described in steps A and B of Example 2, there was obtained 2-methoxy-7-chloro-10-[3-(4 - morpholinyl) - propylidene] - thiaxanthene hydrochloride.

EXAMPLE 7

3,8-di-propoxy-10-(3-dipropylaminopropylidene)-thiaxanthene hydrochloride

By replacing the 3-dimethylaminopropyl chloride and the 2-chlorothiaxanthone used in Example 2 by an equimolecular quantity of 3-dipropylaminopropyl chloride and 3,8-dipropoxythiaxanthone respectively and following substantially the same procedures described in steps A and B of Example 2, there was obtained 3,8-di-propoxy-10-(3-dipropylaminopropylidene) - thiaxanthene hydrochloride.

EXAMPLE 8

2-chloro-8-ethyl-10-(2-methyl-3-dimethylaminopropylidene)-thiaxanthene hydrochloride By replacing the 2-chlorothiaxanthone used in Example 2 by an equimolecular quantity of 2-chloro-8-ethylthiaxanthone, and following substantially the same procedures described in steps A and B of Example 2, there was obtained 2-chloro-8-ethyl-10-(2-methyl-3-dimethylaminopropylidene)-thiaxanthene hydrochloride.

EXAMPLE 9

2-chloro-10-[3-(1-piperidyl)-propylidene]-thiaxanthene hydrochloride

By replacing the 3-dimethylaminopropyl chloride used in Example 2 by an equimolecular quantity of 3-(1-piperidyl)-propyl chloride, and following substantially the same procedure described in steps A and B of Example 2, there was obtained 2-chloro-10-[3-(1-piperidyl)-propylidene]-thiaxanthene hydrochloride.

EXAMPLE 10

7-propyl-10-[3-(1-pyrrolidyl)-propylidene]-thiaxanthene hydrochloride

By replacing the 3-dimethylaminopropyl chloride and the 2-chlorothiaxanthone used in Example 2 by an equimolecular quantity of 3-(1-pyrrolidyl)-propyl chloride and 7-propylthiaxanthone respectively, there was obtained 7 - propyl - 10 - [3-(1-pyrrolidyl)-propylidene]-thiaxanthene hydrochloride.

EXAMPLE 11

α- and β-forms of 2-chloro-10-(3-diethylaminopropylidene)-thiaxanthene hydrochloride Step A.—The Grignard reagent was prepared from 4.86 g. (0.2 g. atom) of magnesium and 29.9 g. (0.2 mole) of 3-diethylaminopropyl chloride following essentially the procedure described in step A of Example 2. The reaction mixture then was stirred and cooled in an ice-bath while 24.67 g. (0.1 mole) of 2-chlorothiaxanthone was added over a period of 10 minutes. The mixture then was allowed to warm up to room temperature and stirred at refluxing for 1 hour. The reaction mixture then was distilled until 75 ml. of distillate has been collected and the residue diluted with 150 ml. of benzene. The reaction mixture was hydrolysed in the cold by the dropwise addition of 70 ml. of 30% ammonium chloride solution. The benzene layer was separated by decantation and the gelatinous solid extracted with two 100 ml. portions of benzene. The solid then was stirred with 50 ml. of 10 N sodium hydroxide, mixed with diatomaceous earth and the mixture filtered. The filtrate was extracted with 50 ml. of benzene and the combined benzene extracts washed with water and evaporated to dryness. The residue was an oily solid weighing 36.6 g., M.P. 108–112° C. (sintering at 105°). The product was recrystallized from a mixture of benzene and hexane to give 29.75 g. (82%) of 2-chloro-10-(3-diethylaminopropyl)-10-hydroxythiaxanthene, M.P. 115–117° C. Recrystallization from mixtures of benzene and hexane yielded the product with a constant M.P. of 116.2–118.2° C.

Analysis.—Calculated for $C_{20}H_{24}ONClS$: C, 66.37; H, 6.68; N, 3.87. Found: C, 66.14; H, 6.97; N, 3.87.

Step B.—The product obtained in step A, 7.24 g. (0.02 mole) was dissolved in 30 ml. of dry, alcohol-free chloroform and 4.72 g. (0.06 mole) of acetyl chloride added. The solution was refluxed for 1 hour and the solvent evaporated on the steam-bath under reduced pressure. The 2-chloro-10-(3-diethylaminopropylidene)-thiaxanthene hydrochloride was separated into the α- and β-forms by dissolving the residue in a mixture of absolute alcohol and absolute acetone and fractionally precipitating with absolute ether.

The α-form melted at 220.3–222.3° C. after repeated recrystallization from a mixture of absolute ethanol and absolute ether.

Analysis.—Calculated for $C_{20}H_{22}NClS \cdot HCl$: C, 63.15; H, 6.09; N, 3.68. Found: C, 62.96; H, 6.13; N, 3.66.

The β-form melted at 153.8–155.3° C. after repeated recrystallization from acetone-ether mixtures.

Analysis.—Calculated for $C_{20}H_{22}NClS \cdot HCl$: C, 63.15; H, 6.09; N, 3.68. Found: C, 63.12; H, 6.24; N, 3.65.

EXAMPLE 12

2-methoxy-10-(3-dimethylaminopropylidene)-thiaxanthene hydrogen oxalate

Step A.—The Grignard reagent was prepared from 2.61 g. (0.107 mole) of magnesium and 13.05 g. (0.0539 mole) of 3-dimethylaminopropyl chloride in 50 ml. of dry tetrahydrofuran essentially as described in step A of Example 2. 2-methoxythiaxanthone, 13.00 g. (0.0537 mole), was added to the reaction mixture at 25° C. with stirring. After stirring for 15 minutes at room temperature, the mixture was heated to refluxing for 1 hour. The product was isolated following the procedure described in step A of Example 2. The yield of 2-methoxy-10-(3-dimethylaminopropyl) - 10 - hydroxythiaxanthene was 14.17 g. (80%) after recrystallization from a mixture of benzene and hexane. Further recrystallization from mixtures of benzene and hexane yielded the product melting at 123–124° C.

Analysis.—Calculated for $C_{19}H_{23}O_2NS$: C, 69.26; H, 7.04; N, 4.25; S, 9.73. Found: C, 69.24; H, 6.98; N, 4.33; S, 9.61.

Step B.—The product obtained in step A, 8.87 g. (0.0269 mole), was dissolved in 40 ml. of dry, alcohol-free chloroform and the solution treated with 6.35 g. (0.0809 mole) acetyl chloride. After refluxing the solution for one hour, the solvent was evaporated on the steam-bath under reduced pressure. The residue was dissolved in 50 ml. of water and the solution was made basic with 10 ml. of 5 N sodium hydroxide. The mixture was extracted with benzene and the extract evaporated leaving the red oily base, 2-methoxy-10-(3-dimethylaminopropylidene)-thiaxanthene. The base was treated with oxalic acid in absolute alcohol solution and the hydrogen oxalate precipitated by addition of absolute ether. After recrystallization from alcohol-ether mixtures the 2 - methoxy-10-(3-dimethylaminopropylidene)-thiaxanthene hydrogen oxalate melted at 135–138° C. (sintered at 132° C.).

*Analysis.*—Calculated for $C_{19}H_{21}ONS \cdot C_2H_2O_4$: C, 62.82; H, 5.77; N, 3.49. Found: C, 62.70; H, 5.87; N, 3.51.

EXAMPLE 13

2,8-dichloro-10-(3-dimethylaminopropylidene)-thiaxanthene hydrochloride

*Step A.*—The Grignard reagent was prepared from 9.35 g. (0.384 g. atom) of magnesium and 46.7 g. (0.384 mole) of 3-dimethylaminopropyl chloride, using 3.3 g. of ethyl bromide and employing 150 ml. of tetrahydrofuran as solvent. The procedure of Example 2, step A was followed. To the Grignard solution was added 54 g. (0.192 mole) of 2,8-dichloro-thiaxanthone. After stirring at room temperature for 1 hour, the bulk of the tetrahydrofuran was distilled at reduced pressure keeping the temperature below 50° C. The residue was taken up in benzene and hydrolyzed in the cold by the dropwise addition of 75 ml. of water. The benzene layer was separated and the solid extracted with four 100 ml. portions of hot benzene. The combined benzene extracts were concentrated under reduced pressure and the residue crystallized from a mixture of benzene and hexane. The yield of product, 2,8-dichloro-10-(3-dimethylaminopropyl)-10-hydroxy thiaxanthene, M.P. 191.3–192.3° C., was 46.6 g. The product from a similar experiment melted at 190.8–191.8° C. after repeated crystallization from mixtures of benzene and hexane.

*Analysis.*—Calculated for $C_{18}H_{19}ONCl_2S$: C, 58.70; H, 5.20; N, 3.80. Found: C, 58.77; H, 5.09; N, 3.79.

*Step B.*—The thus obtained 2,8-dichloro-10-(3-dimethylaminopropyl)-10-hydroxy thiaxanthene, 7.2 g. (0.0195 mole), and 4.72 g. (0.06 mole) of acetyl chloride was dissolved in 30 ml. of alcohol-free chloroform. The solution was refluxed for one hour, then evaporated to dryness on the steam-bath under reduced pressure. The residual solid was taken up in hot alcohol, the solution cooled in ice and treated with 20% aqueous sodium hydroxide. The product solidified rapidly and was collected and dried at 70° C. to obtain 6.7 g. of crude 2,8-dichloro-10-(3-dimethylaminopropylidene)-thiaxanthene hydrochloride, M.P. 92–95° C. Recrystallization from a mixture of alcohol and water gave 5.25 g. of the purified product, M.P. 97.5–99.0° C. The pure product obtained in another experiment melted at 99–100° C. (sintered at 98° C.).

*Analysis.*—Calculated for $C_{18}H_{17}NCl_2S$: C, 61.71; H, 4.89; N, 4.00. Found: C, 61.66; H, 4.94; N, 3.90.

EXAMPLE 14

2-methyl-10-(3-dimethylaminopropylidene)-thiaxanthene hydrochloride

By replacing the 2-chlorothiaxanthone used in Example 2 by an equimolecular quantity of 2-methylthiaxanthone, and following substantially the same procedures described in steps A and B of Example 2, there was obtained 2-methyl - 10-(3-dimethylaminopropylidene) - thiaxanthene hydrochloride.

EXAMPLE 15

2-chloro-10-(3-dimethylaminopropylidene)-thiaxanthene hydrochloride

*Step A.*—Magnesium turnings, 6.07 g. (0.25 mole), were ground under benzene in a mortar and placed in a 500 ml. three-necked flask equipped with a mercury sealed stirrer, reflux condenser and dropping funnel. Absolute ether, 110 ml., was added followed by 1.36 g. (0.013 mole) of ethyl bromide. An atmosphere of hydrogen was maintained in the apparatus throughout the reaction. A solution of 33.2 g. (0.2 mole) of 3-dimethylaminopropyl bromide in 146 ml. of absolute ether then was added at such a rate that refluxing was maintained. The addition required 35 minutes. 2-chlorothiaxanthone, 16.0 g. (0.065 mole), was added in portions of 4.0 g. at intervals of 30 minutes. The reaction mixture then was refluxed for 1 hour. The reaction mixture was treated with 100 ml. of water with stirring and cooling, then diluted with 100 ml. of benzene and filtered through a mat of glass wool. The filter cake was extracted with three 100 ml. portions of hot benzene and the combined extracts evaporated to give 20.8 g. of crude 2-chloro-10-(3-dimethylaminopropyl)-10-hydroxythiaxanthene. The purified product was obtained by a process of recrystallization and extraction of the mother liquors by citric acid, the base was liberated from the citric acid solution by sodium hydroxide. The combined yield was 61%, M.P. 152–153° C.

*Step B.*—The thus obtained 2-chloro-10-(3-dimethylaminopropyl)-10-hydroxythiaxanthene was dehydrated by substantially the same procedure described in step B, Example 2, to 2-chloro-10-(3-dimethylaminopropylidene)-thiaxanthene hydrochloride.

EXAMPLE 16

2-chloro-10-(3-dimethylaminopropylidene)-thiaxanthene hydrochloride

*Step A.*—The Grignard reagent was prepared from 6.07 g. (0.25 mole) of magnesium and 24.3 g. (0.2 mole) of dimethylaminopropyl chloride in 256 ml. of absolute ether following the procedure of Example 15. 2-chlorothiaxanthone, 24.67 g. (0.1 mole), was added in 5 portions at 30 minute intervals. The product was isolated substantially as described in Example 15. The yield of recrystallized 2 - chloro-10-(3-dimethylaminopropyl)-10-hydroxythiaxanthene, M.P. 152.5–154.0° C., was 15.24 g. (46%).

*Step B.*—The thus obtained 2-chloro-10-(3-dimethylaminopropyl)-10-hydroxythiaxanthene was dehydrated by substantially the same procedure described in step B, Example 2, to 2 - chloro - 10 - (3-dimethylaminopropylidene)-thiaxanthene hydrochloride.

While the invention has been illustrated to be particularly 10 - (3 - tertiaryaminopropylidene)-thiaxanthene compounds and particular methods for the preparation of these compounds, the invention embraces the chemical equivalents of the specifically identified compounds as well as the modifications of the methods described for their synthesis.

What is claimed is:

The process for preparing 10-(3-tertiaryamino-propyl)-10-hydroxythiaxanthenes having the structure:

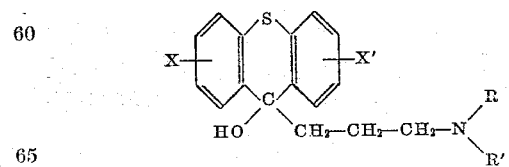

wherein X and X' respectively are selected from the group consisting of hydrogen, halogen, lower alkyl, and lower alkoxy radicals, the group

is selected from the group consisting of di-lower alkylamino, 1-piperidyl, 1-pyrrolidyl, and 4-morpholinyl, which comprises adding together a 3-tertiary-aminopropyl-halide the tertiary amino portion of which is

as defined above and the halide is selected from the group consisting of chlorine and bromine, magnesium and tetrahydrofuran, applying heat to maintain at refluxing temperature, then cooling to a temperature not higher than room temperature and adding to the resulting mixture containing the Grignard reagent a thiaxanthenone having the structure:

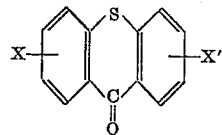

in which X and X' are as above defined, and adding water to hydrolyze the resulting Grignard adduct to thereby obtain the desired product.

References Cited in the file of this patent

UNITED STATES PATENTS 2,368,006    Cusic _____ Jan. 23, 1945